(12) United States Patent
Takizawa et al.

(10) Patent No.: US 8,829,758 B2
(45) Date of Patent: Sep. 9, 2014

(54) ROTARY ELECTRIC MACHINE

(75) Inventors: Yuji Takizawa, Chiyoda-ku (JP); Yu Hirotani, Chiyoda-ku (JP); Ryuichi Takiguchi, Chiyoda-ku (JP); Hiroko Ueyama, Chiyoda-ku (JP); Satoru Akutsu, Chiyoda-ku (JP); Masatsugu Nakano, Chiyoda-ku (JP); Tetsuya Iwata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 13/614,596

(22) Filed: Sep. 13, 2012

(65) Prior Publication Data

US 2013/0234555 A1    Sep. 12, 2013

(30) Foreign Application Priority Data

Mar. 6, 2012    (JP) .................. 2012-049433

(51) Int. Cl.
*H02K 1/27* (2006.01)

(52) U.S. Cl.
CPC .................... *H02K 1/2773* (2013.01)
USPC .......... 310/216.016; 310/156.48; 310/156.55; 310/156.56

(58) Field of Classification Search
None
See application file for complete search history.

(56) References Cited

U.S. PATENT DOCUMENTS

| | | | | |
|---|---|---|---|---|
| 4,469,970 A | * | 9/1984 | Neumann | 310/156.78 |
| 4,700,096 A | * | 10/1987 | Epars | 310/153 |
| 5,010,266 A | * | 4/1991 | Uchida | 310/156.22 |
| 5,378,953 A | * | 1/1995 | Uchida et al. | 310/156.59 |
| 5,886,441 A | * | 3/1999 | Uchida et al. | 310/156.57 |
| 5,889,346 A | * | 3/1999 | Uchida et al. | 310/156.57 |
| 5,939,810 A | * | 8/1999 | Uchida et al. | 310/156.57 |
| 6,703,741 B1 | * | 3/2004 | Ifrim | 310/156.19 |
| 6,849,981 B2 | | 2/2005 | Kojima et al. | |

FOREIGN PATENT DOCUMENTS

| | | |
|---|---|---|
| JP | 06-245451 A | 9/1994 |
| JP | 10-066285 A | 3/1998 |
| JP | 2000-050544 A | 2/2000 |
| JP | 2001-061245 A | 3/2001 |
| JP | 2007-053351 A | 3/2007 |
| JP | 2010-183684 A | 8/2010 |
| WO | 03/079516 A1 | 9/2003 |

* cited by examiner

*Primary Examiner* — Tran Nguyen (74) *Attorney, Agent, or Firm* — Sughrue Mion, PLLC

(57) ABSTRACT

Provided is a rotary electric machine, including: a stator; and a rotor provided on the stator so as to be rotatable about a rotation shaft, in which the rotor includes, at an outer circumference thereof, magnetic poles arranged so as to have different polarities alternately, the magnetic poles being formed of a rotor core in which electromagnetic steel plates are stacked, the magnetic poles being excited by permanent magnets which are housed in gaps disposed at an outer circumferential part of the rotor core, and in which the rotor core includes, at an inner circumferential part thereof, in the same stack plane: a short circuit magnetic path connecting magnetic pole pieces which form the magnetic poles; and a protruding portion held in contact with the permanent magnets, which is positioned between magnetic pole pieces which are not connected to the short circuit magnetic path.

7 Claims, 8 Drawing Sheets

11 : SHORT CIRCUIT MAGNETIC PATH
12 : PROTRUDING PORTION

2a, 2b, 2c : ROTOR CORE LAYER
10a, 10b : MAGNETIC POLE PIECE
11 : SHORT CIRCUIT MAGNETIC PATH
20 : ROTOR CORE ASSEMBLY

FIG.1

1 : ELECTRIC MOTOR  6 : STATOR
2 : ROTOR CORE  7 : TOOTH
3 : PERMANENT MAGNET  8 : COIL
4 : ROTOR  9 : GAP
5 : ROTATION SHAFT  10 : MAGNETIC POLE

FIG.2(a)

11 : SHORT CIRCUIT MAGNETIC PATH
12 : PROTRUDING PORTION

FIG.2(b)

2a, 2b, 2c : ROTOR CORE LAYER
10a, 10b : MAGNETIC POLE PIECE
11 : SHORT CIRCUIT MAGNETIC PATH
20 : ROTOR CORE ASSEMBLY

2d, 2e : ROTOR CORE LAYER

3a : INNER CIRCUMFERENTIAL PART OF PERMANENT MAGNET
3b : OUTER CIRCUMFERENTIAL PART OF PERMANENT MAGNET

FIG.10

ROTARY ELECTRIC MACHINE

BACKGROUND OF THE INVENTION

1. Field of the Invention

The present invention relates to a rotary electric machine including a rotor in which permanent magnets are housed in a rotor core thereof.

2. Description of the Related Art

In a conventional synchronous motor, a rotor includes permanent magnets which are disposed around a rotation shaft at substantially regular intervals, and stacked core members which are disposed between the permanent magnets and form magnetic poles, respectively. The stacked core members are formed by mutually stacking and combining a large number of thin plate core pieces and integral thin plate cores which are made of a magnetic material. The integral thin plate cores include thin plate core piece portions having the same polarity applied thereto and having the same shape as that of the thin plate core piece, and connection portions which mutually connect these thin plate core piece portions. When the large number of thin plate core pieces and the integral thin plate cores are integrally combined by caulking, the respective stacked core members are mutually connected at relative positions at the time of completing assembly, in which placement spaces for the permanent magnets are provided between adjacent stacked core members. Thus, an integral stacked rotor core is formed.

In general, in a rotary electric machine including a rotor in which permanent magnets are housed in a rotor core thereof, output of the rotary electric machine is lowered by a leakage flux between the magnetic poles having different polarities, which flows within the rotor and does not contribute to torque. In the conventional synchronous motor, the magnetic poles having different polarities are prevented from being short-circuited at the connection portion so as to reduce the leakage flux by using the integral thin plate cores, in which only the thin plate core piece portions having the same polarity applied thereto are connected to one another via the connection portion.

Moreover, in the conventional synchronous motor, layers of only the thin plate core pieces including no connection portion are disposed to be stacked between the integral thin plate core forming the magnetic pole of one polarity and the integral thin plate core forming the magnetic pole of the other polarity so that the three dimensional leakage flux is suppressed (for example, see Japanese Patent Application Laid-open No. Hei 6-245451).

In the conventional synchronous motor, when the rotation shaft is a magnetic body, a leakage flux is generated via the rotation shaft even when no short circuit magnetic path exists between the stacked rotor core layers. A leakage flux amount of the respective magnetic poles can be equalized in the entire rotor to some extent by applying rotational stacking, but there still exist, in the respective magnetic poles, a difference of a leakage flux amount in the rotation axis direction, and a difference of a leakage flux amount on the same stack plane. Due to these differences of the leakage flux amounts, non-uniformity of the magnetic flux amount from the respective magnetic poles contributing to the torque occurs, which leads to a problem in that vibrations occur in the electric motor due to rotation fluctuation and unbalance of force at the rotor.

SUMMARY OF THE INVENTION

The present invention has been made to solve the above-mentioned problem, and it is therefore an object thereof to obtain a rotary electric machine which is reduced in rotation fluctuation and unbalance of force at a rotor by equalizing a leakage flux amount of respective magnetic poles.

According to an exemplary embodiment of the present invention, there is provided a rotary electric machine, including: a stator; and a rotor provided on an inner side of the stator so as to be rotatable about a rotation shaft, in which the rotor includes, at an outer circumference thereof, magnetic poles arranged so as to have different polarities alternately, the magnetic poles being formed of a rotor core in which electromagnetic steel plates are stacked, the magnetic poles being excited by permanent magnets which are respectively housed in a plurality of gaps disposed along a circumferential direction at an outer circumferential part of the rotor core, and in which the rotor core includes, at an inner circumferential part thereof, in the same stack plane: a short circuit magnetic path mutually connecting at least one set of magnetic pole pieces which form the magnetic poles, respectively; and a protruding portion held in contact with an inner circumferential side of each of the permanent magnets, which is positioned between the magnetic pole pieces which are not connected to the short circuit magnetic path.

According to the present invention, it is possible to suppress the rotation fluctuation and the unbalance of force at the rotor of the rotary electric machine including the rotor in which the permanent magnets are housed in the rotor core thereof.

DETAILED DESCRIPTION OF THE PREFERRED EMBODIMENTS

First Embodiment

Figure 1:
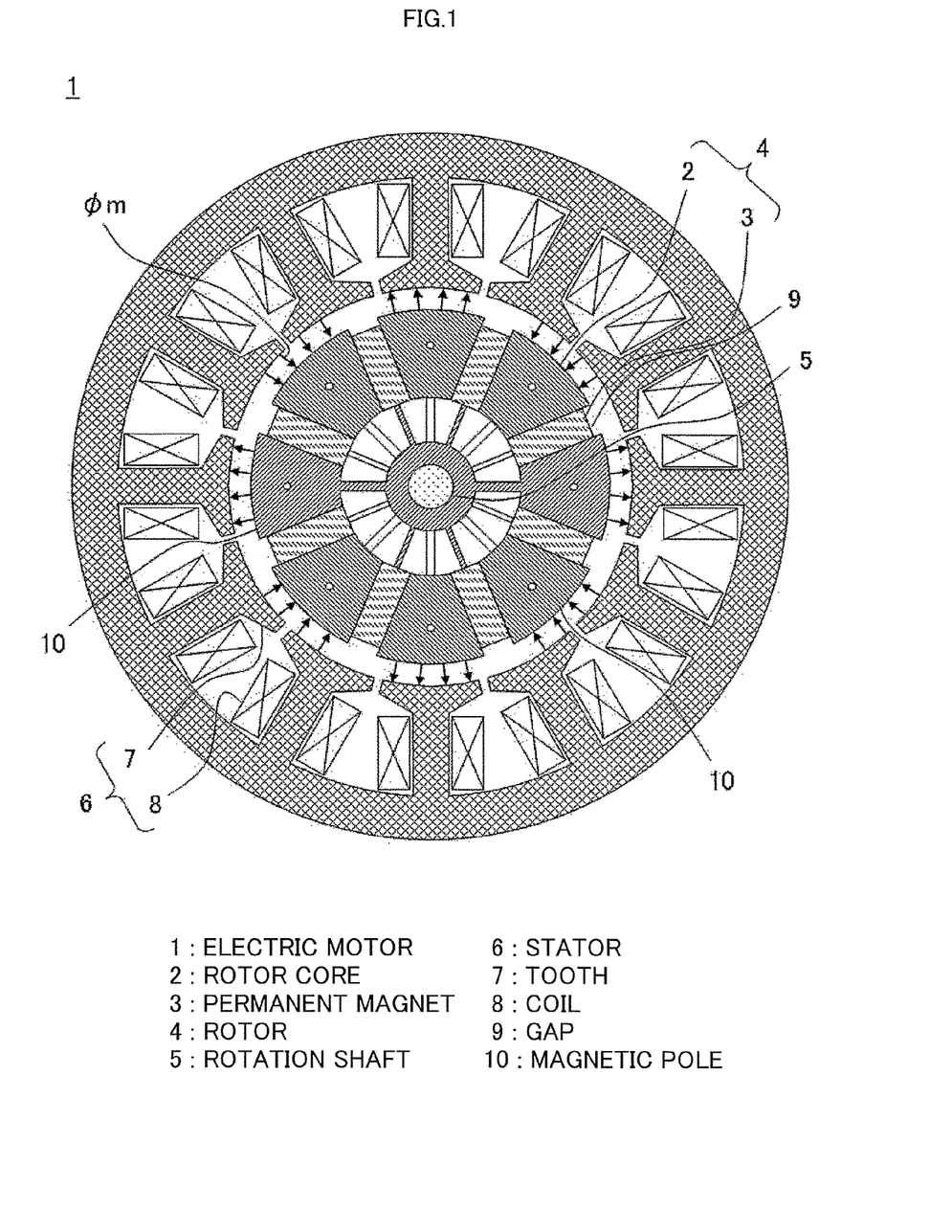
FIG. 1 is a cross-sectional view illustrating an electric motor according to a first embodiment of the present invention.

FIG. 1 illustrates a rotary electric machine according to a first embodiment of the present invention. Specifically, FIG. 1 is a cross-sectional view taken along a plane perpendicular to a rotation shaft 5, and illustrates an electric motor 1 including a rotor 4 in which permanent magnets 3 are housed in a rotor core 2 (hereinafter, referred to as an embedded magnet-type electric motor 1). This embedded magnet-type electric motor 1 is, for example, an electric motor to be used for an electric power steering device, and includes a stator 6, and the rotor 4 rotatably provided on an inner side of this stator 6. In the stator 6, coils 8 are wound around respective teeth 7 which are formed at intervals in a circumferential direction of the stator 6.

Figure 2A:
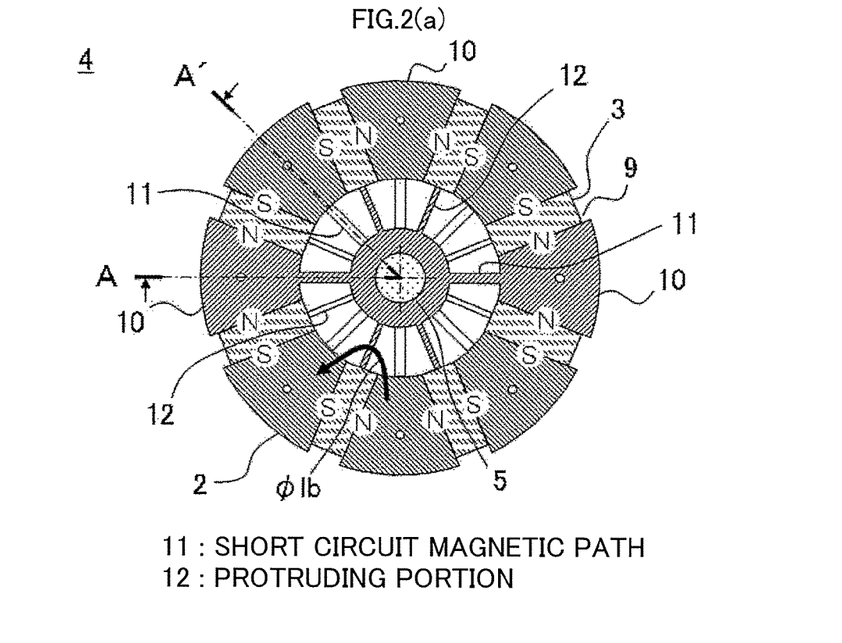
FIGS. 2A and 2B are cross-sectional views of a rotor according to the first embodiment of the present invention.
Figure 2B:
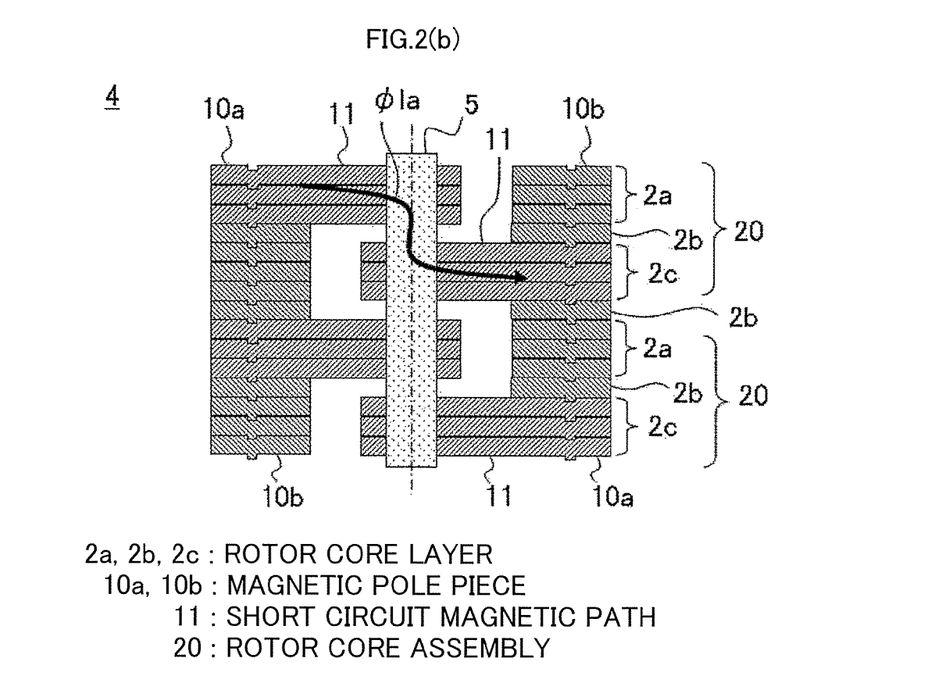
Figure 3A:
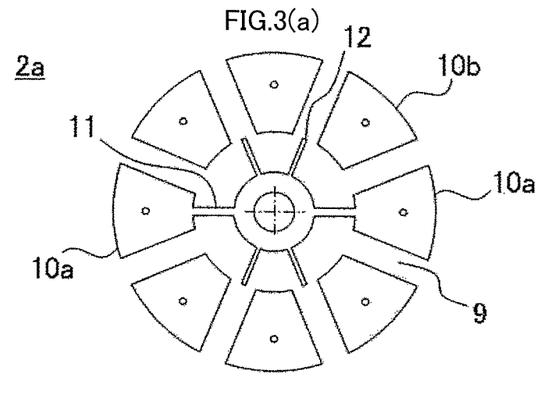
FIGS. 3A to 3C are plane views of layers of a stacked rotor core according to the first embodiment of the present invention.
Figure 3B:
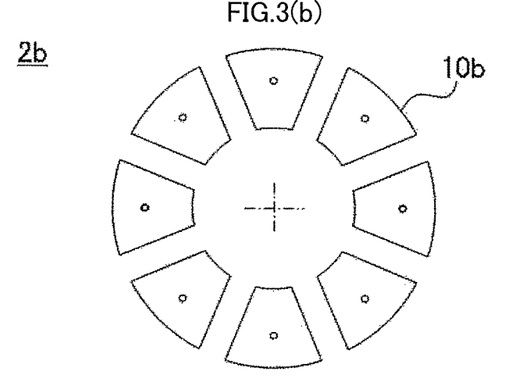
Figure 3C:
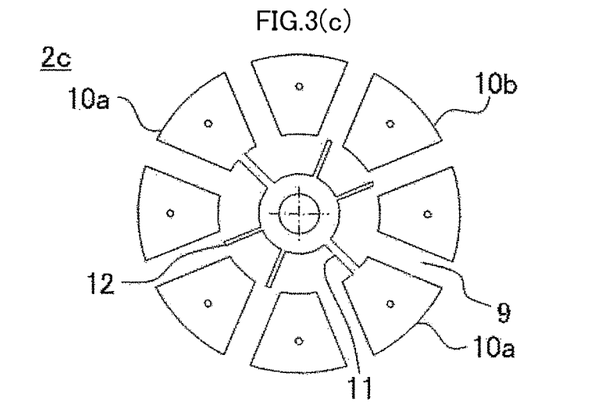

FIG. 2A is a cross-sectional view taken along a plane perpendicular to the rotation shaft 5, and illustrates the rotor 4 of the embedded magnet-type electric motor 1 of FIG. 1, and FIG. 2B is a cross-sectional view taken along the line A-A' of FIG. 2A. The rotor core 2 is formed by stacking electromagnetic steel plates in an axial direction of the rotation shaft 5. FIGS. 3A to 3C are plan views respectively illustrating, in a rotor core assembly 20 illustrated in FIG. 2B, a rotor core layer 2a made of stacked steel plates of three layers and disposed as an upper layer of the rotor core assembly 20, a rotor core layer 2b made of a stacked steel plate of one layer and disposed as an intermediate layer of the rotor core assembly 20, and a rotor core layer 2c made of stacked steel plates of three layers and disposed as a lower layer of the rotor core assembly 20.

As illustrated in FIG. 2A, in the rotor 4, permanent magnets 3 having a rectangular parallelepiped shape are respectively housed in a plurality of gaps 9 which are arranged along the circumferential direction at an outer circumferential part of the rotor core 2. These permanent magnets 3 are embedded in the gaps 9 so that longitudinal directions of the permanent magnets 3 extend along radial direction lines starting from a center line of the rotation shaft 5, and are magnetized with south poles and north poles which are circumferentially directed. With this, on the outer circumference of the rotor 4, there are formed magnetic poles 10 having north poles and south poles alternately disposed in the circumferential direction.

As illustrated in FIG. 2B and FIGS. 3A to 3C, the rotor core 2 is formed of two sets of rotor core assemblies 20 which sandwich the rotor core layer 2b in which no short circuit magnetic path 11 is disposed. The two sets of rotor core assemblies 20 are stacked with rotation of 90 degrees (rotationally stacked).

The rotor core assembly 20 is formed so that the rotor core layer 2b formed of magnetic pole pieces 10b, all of which are not connected via the short circuit magnetic path 11, is sandwiched between the rotor core layer 2a formed of one set of magnetic pole pieces 10a having the same polarity, which are connected via the short circuit magnetic path 11, and the magnetic pole pieces 10b, which are not connected via the short circuit magnetic path 11, and the rotor core layer 2c similarly formed of the magnetic pole pieces 10a and the magnetic pole pieces 10b. Moreover, the rotor core layer 2a and the rotor core layer 2c have the same shape, but the rotor core layer 2c is stacked with rotation of 45 degrees, which correspond to a clockwise amount of one pole with respect to the rotor core layer 2a.

The rotation shaft 5 which is a magnetic body is inserted into the rotationally stacked layers of the rotor core 2 by press-fitting or screw fastening. Moreover, in each of the rotor core layers 2a, 2c, there are disposed protruding portions 12 of electromagnetic steel plates extending from the rotation shaft 5 side toward the gaps 9 between the magnetic pole pieces 10b to which the short circuit magnetic path 11 is not connected. The protruding portions 12 are held in contact with the inner circumferential parts of the permanent magnets 3 so as to position the permanent magnets 3.

In the embedded magnet-type electric motor 1 according to this embodiment, as illustrated in FIG. 1, main magnetic fluxes Φm are generated, which flow in the gap between the stator 6 and the rotor 4 from the outer circumferential surfaces of the respective magnetic poles 10 which are excited by the permanent magnets 3. Moreover, as illustrated in FIG. 2B, in the magnetic pole pieces 10a connected via the short circuit magnetic paths 11, leakage fluxes Φ1a flow three-dimensionally via the short circuit magnetic paths 11 and the rotation shaft 5. On the other hand, as illustrated in FIG. 2A, leakage fluxes Φ1b flow via the protruding portions 12, which is a magnetic body, between the magnetic pole pieces 10b which are not connected via the short circuit magnetic paths 11. Thus, the short circuit magnetic paths 11 and the protruding portions 12 are disposed so that the amount of the leakage fluxes Φ1a from the respective magnetic pole pieces 10a and the amount of the leakage fluxes Φ1b from the respective magnetic pole pieces 10b in the same stack plane can be equalized. Accordingly, the difference of the leakage flux amounts at the respective magnetic poles 10, which are formed by stacking these magnetic pole pieces, can be reduced. As a result, the amount of the main magnetic fluxes Φm flowing from the respective magnetic poles 10 to the stator 6 and contributing to the torque can be equalized.

Thus, in order to equalize the amount of the main magnetic fluxes Φm of the respective magnetic poles 10 by reducing the difference of the leakage flux amounts at the respective magnetic poles 10, it is only necessary to suitably design, for example, the number, cross-sectional area, and circumferential width of the protruding portions 12 formed of the electromagnetic steel plates, and the number and cross-sectional area of the short circuit magnetic paths 11.

The rotor core layers 2a, 2c including the short circuit magnetic paths 11 are rotationally stacked, and hence, even if there is unevenness of the leakage fluxes Φ1a, Φ1b among the respective magnetic pole pieces 10a, 10b in the same stack plane, the leakage fluxes for the respective magnetic poles 10 can be equalized so that the amount of the main magnetic fluxes Φm of the respective magnetic poles 10 can be equalized.

Moreover, the rotor core 2 is formed by stacking two sets of the rotor core assemblies 20 with the rotation of 90 degrees so that the weight balance of the entire rotor core 2 in the circumferential direction can be improved, thereby suppressing the noise and vibration during the rotation of the embedded magnet-type electric motor 1.

By the way, this embodiment is configured so that a number N1 of all the magnetic poles is 8 (N1=8), a total number N2 of the permanent magnets 3 adjacent to the magnetic pole pieces 10a having the same polarity, which are connected to the short circuit magnetic paths 11 in the same stack plane, is 4 (N2=4), and a total number N3 of the permanent magnets 3 held in contact with the protruding portions 12 in the same stack plane is 4 (N3=4), so as to have a relationship of N1=N2+N3. However, needless to say, even when the number of the protruding portions 12 is reduced so that the relationship becomes N1>N2+N3, there are still certain advantageous effects. That is, when the relationship is N1≧N2+N3, the amount of the main magnetic fluxes Φm flowing from the respective magnetic poles 10 to the stator 6 and contributing to the torque can be equalized. Note that, N1 is a multiple of 2, which is equal to or more than 6, N2 is a multiple of 2, which is equal to or more than 4, and N3 is an integer, which is equal to or more than 1.

As another example which satisfies this condition, when the rotor has six poles, i.e., N1=6, if two sets of the short circuit magnetic paths 11, which mutually connect the magnetic pole pieces 10a having the same polarity, are disposed (that is, all the magnetic pole pieces having the same polarity are connected), there exists no permanent magnet 3 between the magnetic pole pieces 10b which are not connected to the short circuit magnetic path 11 so that the protruding portions 12 cannot be provided. Therefore, when N1=6, because only one set of the short circuit magnetic paths 11 can be disposed, N2 becomes 4, and N3 corresponding to the number of the protruding portions 12 held in contact with the permanent magnets 3a is selected from 1 or 2.

As described above, the embedded magnet-type electric motor 1 according to the present invention includes the magnetic poles 10 arranged at an outer circumference of the rotor 4 so as to have different polarities alternately. The magnetic poles 10 are formed of the rotor core 2 in which electromagnetic steel plates are stacked. The magnetic poles 10 are excited by the permanent magnets 3 which are respectively housed in the plurality of gaps 9 disposed along the circumferential direction at the outer circumferential part of the rotor core 2. Further, at the inner circumferential part of the rotor core 2, in the same stack plane, the embedded magnet-type electric motor 1 includes the short circuit magnetic paths 11 mutually connecting at least one set of the magnetic pole pieces 10a having the same polarity, which form the respective magnetic poles 10, and the protruding portions 12 held in contact with the inner circumferential sides of the permanent magnets 3 each positioned between the magnetic pole pieces 10b which are not connected to the short circuit magnetic paths 11. Accordingly, the amount of the main magnetic fluxes $\Phi m$ of the respective magnetic poles contributing to the torque can be equalized. With this, non-uniformity of the main magnetic flux densities among the magnetic poles 10 between the stator 6 and the rotor 4 of the embedded magnet-type electric motor 1 can be eliminated so that the rotation fluctuation of the embedded magnet-type electric motor 1 can be suppressed, and the unbalance of force at the rotor 4 can be suppressed.

When magnetization is performed after un-magnetized permanent magnets 3 are inserted into the gaps 9, the amounts of the magnetic fluxes flowing in the respective magnetic poles 10 can be equalized for the entire rotor 4 and, as a matter of course, in the same stack plane. Accordingly, the uneven magnetization of the permanent magnets 3 can be suppressed so that the rotor 4 having uniform demagnetization resistance can be obtained.

Moreover, when such an embedded magnet-type electric motor 1 which is reduced in rotation fluctuation and unbalance of force at the rotor is used as an electric motor of an electric power steering device, the steering feeling of the electric power steering device can be improved, and the noise and vibration can be reduced.

Note that, in this embodiment, the rotation shaft 5 is a magnetic body, but may be a non-magnetic body. In this case, the leakage fluxes $\Phi 1a$ which three-dimensionally flow through the short circuit magnetic paths 11 and the rotation shaft 5 can be greatly reduced. However, the difference between the amount of the leakage fluxes $\Phi 1a$ from the respective magnetic pole pieces 10a and the amount of the leakage fluxes $\Phi 1b$ from the respective magnetic pole pieces 10b can be almost completely eliminated in the same stack plane through suitable adjustment (reduction) of the leakage fluxes $\Phi 1b$, which is achieved by reducing the number, circumferential width, or cross-sectional area of the protruding portions 12.

Second Embodiment

Figure 4:
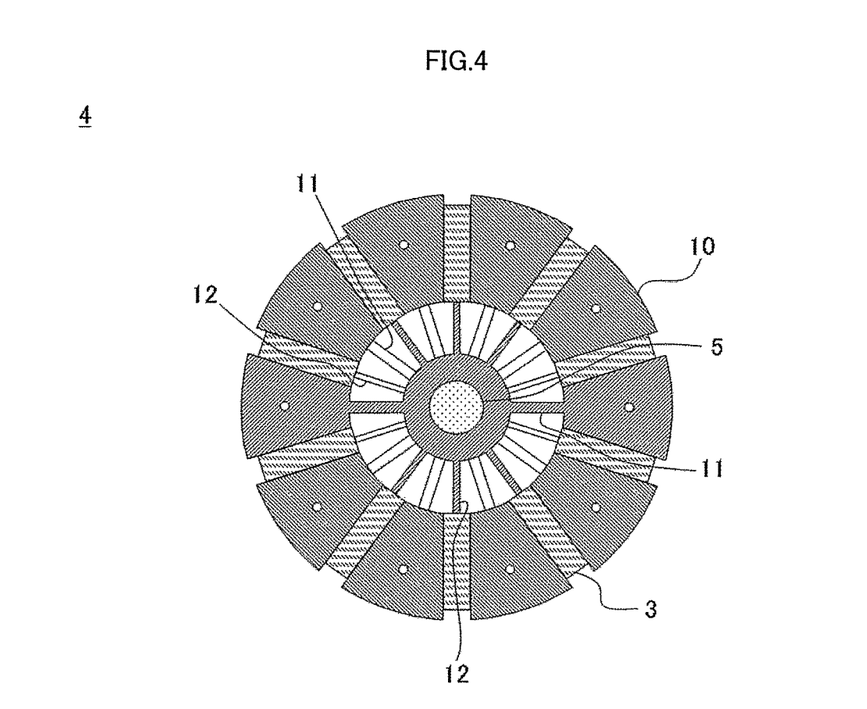
FIG. 4 is a cross-sectional view of a rotor according to a second embodiment of the present invention.

In the first embodiment, the example of the embedded magnet-type electric motor 1 having 8 poles and 12 slots has been described. However, the present invention can be applied also to an embedded magnet-type electric motor having another configuration of pole and slot. FIG. 4 illustrates a case in which the present invention is applied to a rotor 4 having 10 poles, and is a cross-sectional view corresponding to FIG. 2A. The second embodiment is similar to the first embodiment except that the total pole number N1 of the rotor 4 is 10 (N1=10), and along with the increase of the total pole number, the total number N3 of the permanent magnets 3 held in contact with the protruding portions 12 of electromagnetic steel plates in the same stack plane is increased to 6 (N3=6).

Thus, the number of the protruding portions 12 can be increased by increasing the pole number of the rotor 4, and hence the adjustable range for the amount of the leakage fluxes $\Phi 1b$ among the magnetic pole pieces 10b, which are not connected to the short circuit magnetic paths 11, can be enlarged via the protruding portions 12. Therefore, even in a configuration in which the leakage fluxes $\Phi 1a$ of the magnetic pole pieces 10a connected to the short circuit magnetic paths 11 are relatively large, for example, a case in which the rotor core layer 2b of the first embodiment is omitted, an embedded magnet-type electric motor 1 which is reduced in rotation fluctuation and unbalance of force at the rotor can be obtained.

Note that, when the pole number of the rotor 4 is large as in this case, there can be disposed as many protruding portions 12 as to be sufficient for leakage flux adjustment, and hence the rigidity of the rotor 4 may be enhanced by increasing the number of the short circuit magnetic paths 11.

Third Embodiment

Figure 5A:
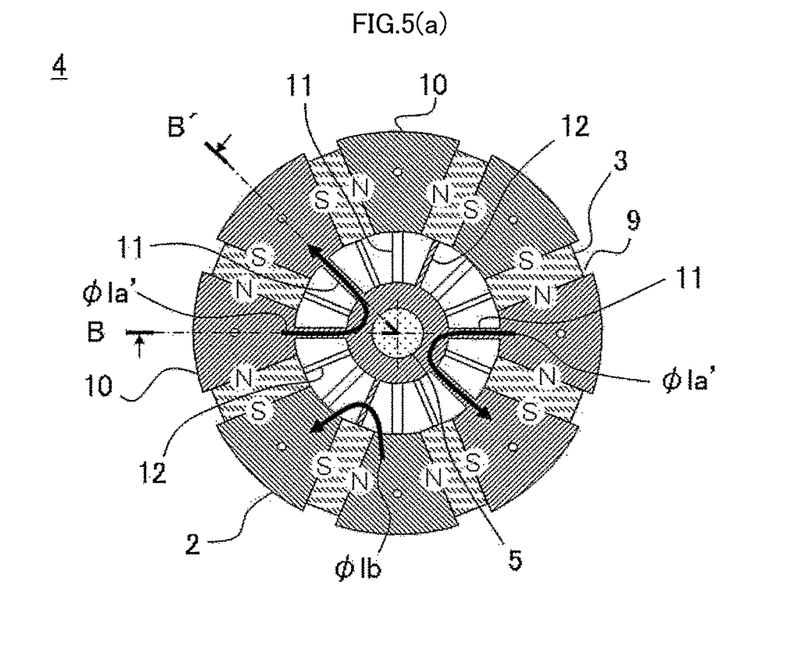
FIGS. 5A and 5B are cross-sectional views of a rotor according to a third embodiment of the present invention.
Figure 5B:
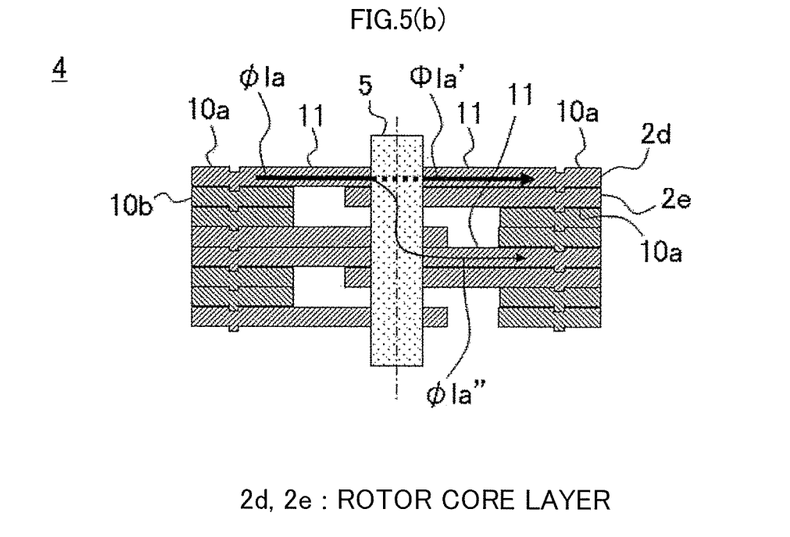
Figure 6A:
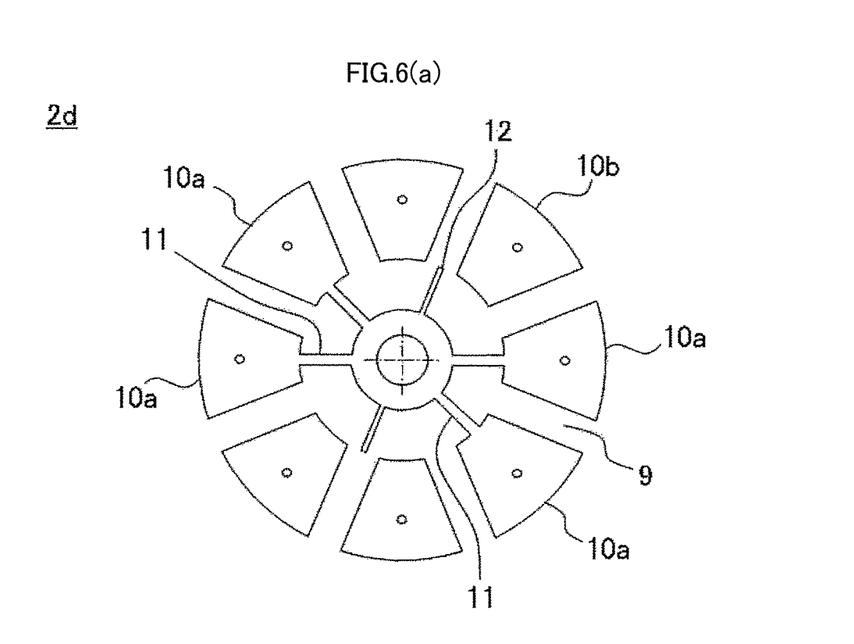
FIGS. 6A and 6B are plane views of layers of a stacked rotor core according to the third embodiment of the present invention.
Figure 6B:
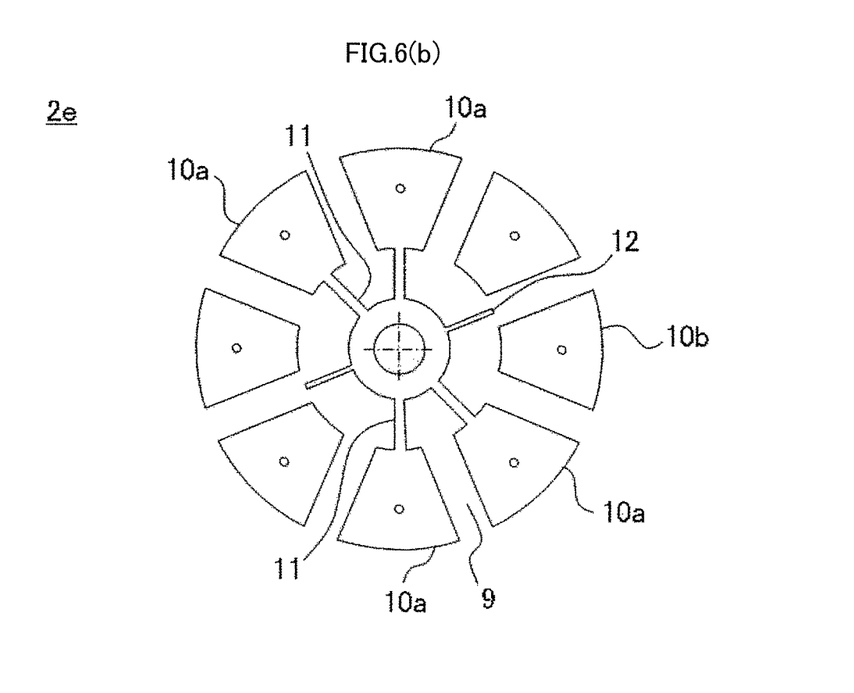

FIGS. 5A and 5B are cross-sectional views illustrating the rotor 4 of an embedded magnet-type electric motor according to a third embodiment of the present invention. FIG. 5A is a cross-sectional view of the rotor 4 taken along a plane perpendicular to the rotation shaft 5, and FIG. 5B is a cross-sectional view taken along the line B-B' of FIG. 5A. The rotor core 2 is formed by rotationally stacking the rotor core layers of electromagnetic steel plates having the same shape in the axial direction of the rotation shaft 5. FIGS. 6A and 6B are plan views illustrating the rotor core layers 2d and 2e, respectively. The rotor core layer 2d illustrated in FIG. 6A and the rotor core layer 2d illustrated in FIG. 6B are the rotor core layers having the same shape. However, the rotor core layer 2e is stacked with clockwise rotation of 45 degrees, which correspond to the amount of one pole, with respect to the rotor core layer 2d. This rotational stacking is repeated until the desired length of the rotor core 2 is obtained.

In the rotor 4, the permanent magnets 3 having a rectangular parallelepiped shape are respectively housed in the plurality of gaps 9 which are arranged along the circumferential direction at the outer circumferential part of the rotor core 2. These permanent magnets 3 are embedded in the gaps 9 so that the longitudinal directions of the permanent magnets 3 extend along the radial direction lines starting from the centerline of the rotation shaft 5, and are magnetized with south poles and north poles which are circumferentially directed. With this, on the outer circumference of the rotor 4, there are formed the magnetic poles 10 having north poles and south poles are alternately disposed in the circumferential direction.

As illustrated in FIG. 5A, in the above-mentioned rotor core layer, two sets of magnetic pole pieces 10a having different polarities are connected by the short circuit magnetic paths 11, and the other part of the rotor core layer is formed of the magnetic pole pieces 10b which are not connected by the short circuit magnetic paths 11. The two short circuit magnetic paths 11 are connected on the center side of the rotor 4, and hence the four magnetic pole pieces 10a in total, which includes the two magnetic pole pieces having the same polarity and the two magnetic pole pieces having the different polarities, are connected by the short circuit magnetic paths 11. The rotation shaft 5 made of a magnetic material is inserted into thus rotationally stacked layers of the rotor core 2 by press-fitting or screw fastening. Moreover, in the above-mentioned rotor core layer, there are disposed the protruding portions 12 of electromagnetic steel plates extending from the rotation shaft 5 side toward the gaps 9 between the magnetic pole pieces 10b to which the short circuit magnetic paths 11 are not connected. The protruding portions 12 are held in contact with the inner circumferential parts of the permanent magnets 3 so as to position the permanent magnets 3. The other parts of the configuration are similar to those of the first embodiment.

In the embedded magnet-type electric motor 1 according to this embodiment, the main magnetic fluxes $\Phi m$ are generated, which flow in the gap between the stator 6 and the rotor 4 from the outer circumferential surfaces of the respective magnetic poles 10 which are excited by the permanent magnets 3. The leakage fluxes $\Phi la$ at the magnetic pole pieces 10a include the leakage flux $\Phi la'$ flowing mainly between the magnetic pole pieces 10a having the different polarities in the same stack plane via the short circuit magnetic path 11, and the leakage flux $\Phi la''$ flowing via the short circuit magnetic path 11 and the rotation shaft 5 which is a magnetic body. The leakage flux $\Phi la'$ is significantly larger than the leakage flux $\Phi la''$. On the other hand, at the magnetic pole pieces 10b, the leakage fluxes $\Phi lb$ flow in the same stack plane via the protruding portions 12. Thus, the short circuit magnetic paths 11 and the protruding portions 12 are disposed so that the respective amounts of the leakage fluxes $\Phi la$ and $\Phi lb$ from the respective magnetic pole pieces 10a and magnetic pole pieces 10b in the same stack plane can be equalized. As a result, the difference of the leakage flux amounts at the respective magnetic poles 10, which are formed by stacking these magnetic pole pieces, can be reduced so that the amount of the main magnetic fluxes $\Phi m$ flowing from the respective magnetic poles 10 to the stator 6 and contributing to the torque can be equalized.

As described above, in this embodiment, the leakage flux $\Phi la'$ in substantially the same stack plane is significantly larger than the leakage flux $\Phi la''$ flowing via the rotation shaft 5. Therefore, in this embodiment, regardless of the fact that the rotation shaft 5 is a magnetic body or a non-magnetic body, the amounts of the leakage fluxes $\Phi lb$ in the same stack plane, which should be adjusted at the protruding portions 12, do not significantly vary. That is, in the configuration in which the magnetic pole pieces having the different polarities are connected via the short circuit magnetic paths 11 in the same stack plane, the effect of the magnetism of the rotation shaft 5 is lesser than that in the configuration in which the magnetic pole pieces having the same polarity are connected by the short circuit magnetic path 11.

The rotor core 2 is formed by rotationally stacking eight layers of the above-mentioned rotor core layers. The minimum unit required for keeping the weight balance of the entire rotor cores 2 in the circumferential direction is four layers. Therefore, the number of the above-mentioned rotor core layers which are rotationally stacked is desirably a multiple of 4.

By the way, this embodiment is configured so that the number N1 of all the magnetic poles is 8 (N1=8), the total number N2 of the permanent magnets 3 adjacent to the magnetic pole pieces 10a including at least one different polarity is 6 (N2=6), and the total number N3 of the permanent magnets 3 held in contact with the protruding portions 12 in the same stack plane is 2 (N3=2), so as to have the relationship of N1=N2+N3. However, because the leakage fluxes $\Phi la$ between the magnetic pole pieces 10a having the different polarities become larger than those in the first embodiment, it is more preferred to set N2=4, in which the number of the short circuit magnetic paths 11 becomes the minimum, i.e., one set, and N1=N2+N3. However, needless to say, even when the number of the protruding portions 12 is reduced so that the relationship becomes N1>N2+N3, there are still certain advantageous effects. That is, when the relationship is N1≥N2+N3, the amounts of the main magnetic fluxes $\Phi m$ flowing from the respective magnetic poles 10 to the stator 6 and contributing to the torque can be equalized. Note that, N1 is a multiple of 2, which is equal to or more than 4, N2 is an integer, which is equal to or more than 3, and N3 is an integer, which is equal to or more than 1.

As another example which satisfies this condition, when the rotor has four poles, i.e., N1=4, in order to provide the magnetic pole pieces 10a having the different polarities, and cause the permanent magnets 3 to exist between the magnetic pole pieces 10b which are not connected to the short circuit magnetic paths 11, because only one short circuit magnetic path 11 can be disposed, N2 becomes 3, and N3 corresponding to the number of the protruding portions 12 held in contact with the permanent magnets 3 is 1, i.e., N3=1.

As described above, the embedded magnet-type electric motor 1 according to the present invention includes the magnetic poles 10 arranged at an outer circumference of the rotor 4 so as to have different polarities alternately. The magnetic poles 10 are formed of the rotor core 2 in which the electromagnetic steel plates are stacked. The magnetic poles 10 are excited by the permanent magnets 3 which are respectively housed in the plurality of gaps 9 disposed along the circumferential direction at the outer circumferential part of the rotor core 2. Further, at the inner circumferential part of the rotor core 2, in the same stack plane, the embedded magnet-type electric motor 1 includes the short circuit magnetic paths 11 mutually connecting the magnetic pole pieces 10a forming the respective magnetic poles 10, which include at least one different polarity, and the protruding portions 12 held in contact with the inner circumferential sides of the permanent magnets 3 each positioned between the magnetic pole pieces 10b which are not connected to the short circuit magnetic paths 11. Accordingly, the amount of the main magnetic fluxes $\Phi m$ of the respective magnetic poles contributing to the torque can be equalized. With this, the rotation fluctuation of the embedded magnet-type electric motor 1 can be suppressed, and the unbalance of force at the rotor 4 can be suppressed.

Fourth Embodiment

Figure 7:
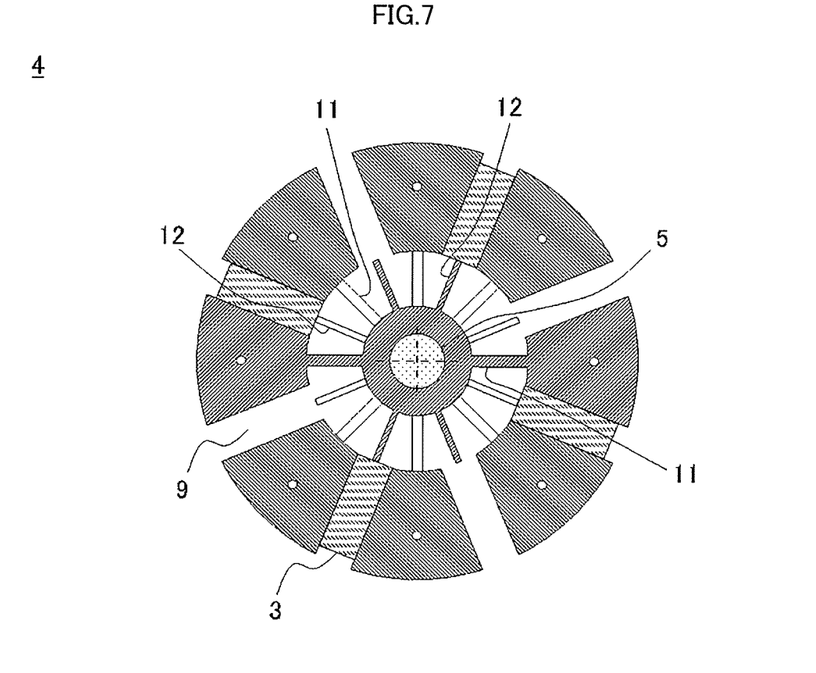
FIG. 7 is a cross-sectional view of a rotor according to a fourth embodiment of the present invention.

FIG. 7 is a cross-sectional view taken along a plane perpendicular to the rotation shaft 5, and illustrates the rotor 4 of an embedded magnet-type electric motor according to a fourth embodiment of the present invention. In this embodiment, the rotor 4 is configured by inserting the permanent magnets 3 in every other gap of the plurality of gaps 9 of the rotor core 2 of the first embodiment. That is, the rotor 4 is a rotor for a consequent-type motor whose number of the embedded permanent magnets 3 is half comparing to that of the first embodiment. The other parts of the configuration are similar to those of the first embodiment.

In the embedded magnet-type electric motor of this embodiment, comparing to the first embodiment, the number of the permanent magnets can be reduced when no large output torque is required, and hence a motor of low cost can be obtained.

Moreover, the magnetic saturation of the short circuit magnetic path 11 is relaxed because the number of the magnets becomes half, and hence the amount of leakage flux Φla becomes larger than that of the first embodiment. Accordingly, the effect of reducing the difference of the leakage flux amount of the respective magnetic poles 10 by disposing the protruding portions 12 is obtained more clearly. As a result, the unbalance of the density of the main magnetic flux Φm between the stator 6 and the rotor 4 is eliminated so that the output torque fluctuation of the embedded magnet-type electric motor is suppressed and the unbalance of force generated at the rotor 4 is suppressed. Moreover, the magnet shift in the radial direction when the permanent magnets 3 are inserted into the rotor 4 can be suppressed because the protruding portions 12 are provided. As a result, the accuracy of the rotor size can be improved, and the uneven magnetization can be suppressed.

Figure 8:
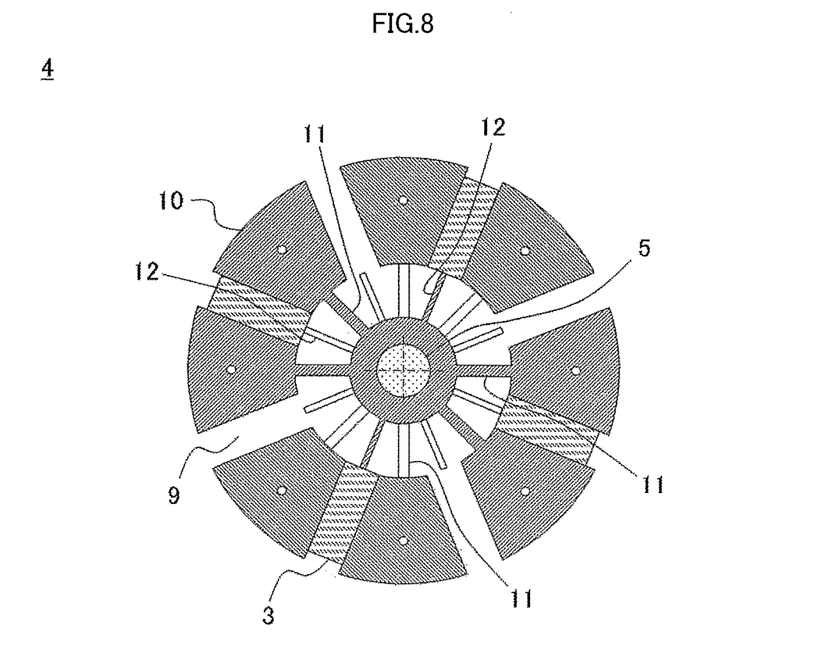
FIG. 8 is a cross-sectional view of the rotor according to the fourth embodiment of the present invention.

Note that, this embodiment shows the case in which the permanent magnets 3 are inserted into every other gap of the plurality of gaps 9 of the rotor core 2 of the first embodiment. However, as illustrated in FIG. 8, the permanent magnets 3 may be inserted into every other gap 9 of the rotor core 2 of the third embodiment so as to obtain a consequent-type motor using a half number of the permanent magnets comparing to the third embodiment. Needless to say, also in such a configuration, the advantageous effects similar to those of the case illustrated in FIG. 7 can be obtained.

Fifth Embodiment

Figure 9:
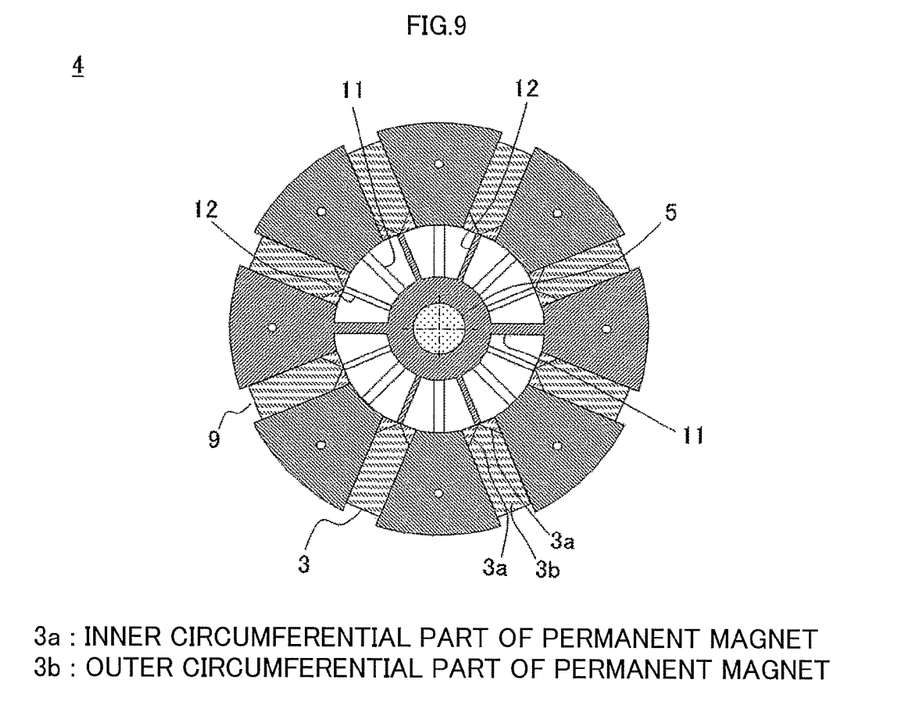
FIG. 9 is a cross-sectional view of a rotor according to a fifth embodiment of the present invention.

FIG. 9 is a cross-sectional view taken along a plane perpendicular to the rotation shaft 5, and illustrates the rotor 4 of an embedded magnet-type electric motor according to a fifth embodiment of the present invention. This embodiment is configured so that, in the permanent magnets 3 of the first embodiment, a rare earth metal, such as dysprosium, for enhancing a coercive force is added to an inner circumferential part 3a of the permanent magnet 3, and no rare earth metal or a smaller amount of the same is added to an outer circumferential part 3b of the permanent magnet 3. The other parts of the configuration are similar to those of the first embodiment.

According to the embedded magnet-type electric motor of this embodiment, the rare earth metal, such as dysprosium, for enhancing the coercive force is added more to the inner circumferential part 3a of the permanent magnet 3, which is susceptible to the demagnetization due to the diamagnetic field (a magnetic field generated in the permanent magnet in the direction opposite to the magnetization direction of the magnet) flowing from the stator 6 via the protruding portions 12, than to the outer circumferential part 3b of the permanent magnet 3. Accordingly, comparing to the case in which the above-mentioned rare earth metal is added to the entire permanent magnet 3, the used amount of the rare earth metal can be reduced so that the rotor 4 of low cost can be obtained.

Sixth Embodiment

Figure 10:
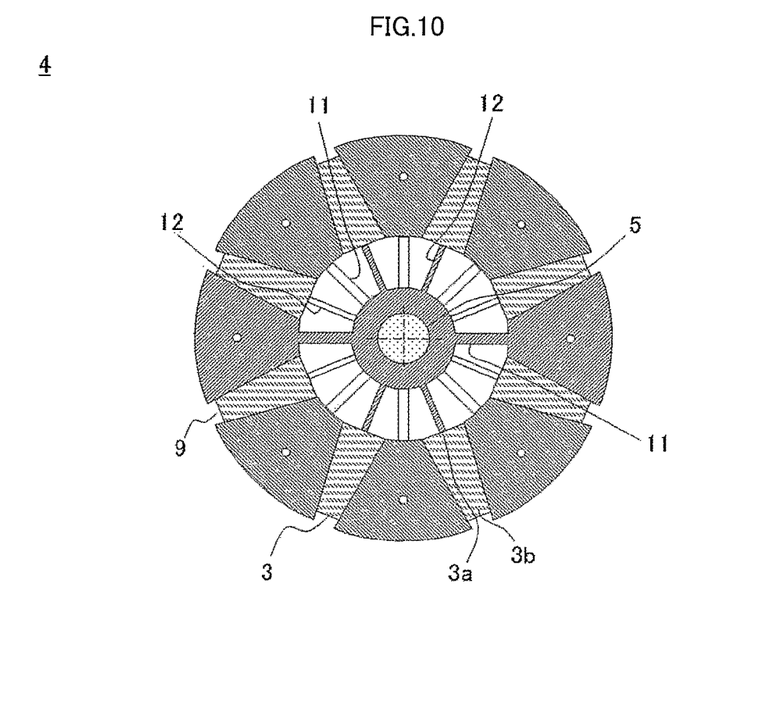
FIG. 10 is a cross-sectional view of a rotor according to a sixth embodiment of the present invention.

FIG. 10 is a cross-sectional view taken along a plane perpendicular to the rotation shaft 5, and illustrates the rotor 4 of an embedded magnet-type electric motor according to a sixth embodiment of the present invention. This embodiment is configured so that, in the rotor 4 of the first embodiment 1, the circumferential width of the part 3a of the permanent magnet 3 positioned at the inner circumferential side of the rotor 4 is set to be larger than the circumferential width of the part 3b of the permanent magnet 3 positioned at the outer circumferential side of the rotor 4. Specifically, as illustrated in FIG. 10, the section of the permanent magnet 3 has a trapezoid shape in which, when the end on the inner circumferential side is the lower base and the end on the outer circumferential side is the upper base, the lower base is longer than the upper base. The other parts of the configuration are similar to those of the first embodiment.

According to the embedded magnet-type electric motor of this embodiment, the circumferential width of the inner circumferential part 3a of the permanent magnet 3 is set to be larger than the circumferential width of the outer circumferential part 3b of the permanent magnet 3. Accordingly, the magnetic flux density at the inner circumferential part 3a of the permanent magnet 3, which is susceptible to the demagnetization due to the diamagnetic field flowing from the stator 6 via the protruding portions 12, can be reduced. With this, there can be obtained the rotor 4 in which the demagnetization of the permanent magnet 3 is less likely to occur.

Note that, the above-mentioned embodiments are examples of the embedded magnet-type electric motor to be used for an electric power steering device and the like. However, needless to say, the present invention can be applied to a rotary electric machine for another use, which includes a rotor with a rotor core in which permanent magnets are housed, for example, a generator.

What is claimed is:

1. A rotary electric machine, comprising: a stator; and a rotor provided on an inner side of the stator so as to be rotatable about a rotation shaft, wherein the rotor comprises, at an outer circumference thereof, magnetic poles arranged so as to have different polarities alternately, the magnetic poles being formed of a rotor core, wherein electromagnetic steel plates are stacked to form the rotor core, the magnetic poles being excited by permanent magnets that are respectively housed in a plurality of gaps disposed along a circumferential direction at an outer circumferential part of the rotor core, and wherein the rotor core comprises, at an inner circumferential part thereof, in a same stack plane: a short circuit magnetic path mutually connecting at least one set of magnetic pole pieces that form the magnetic poles, respectively; and a protruding portion held in contact with an inner circumferential side of each of the permanent magnets, between magnetic pole pieces that are not connected to the short circuit path.

2. A rotary electric machine according to claim 1, wherein the magnetic pole pieces connected to the short circuit magnetic path in the same stack plane have the same polarity, and wherein the following condition is satisfied: $N1 \geq N2+N3$, where N1 represents a number of all the magnetic poles, N2 represents a total number of permanent magnets adjacent to the magnetic pole pieces that are connected to the short circuit magnetic path in the same stack plane, and N3 represents a total number of permanent magnets held in contact with the protruding portion in the same stack plane, provided that N1 is a multiple of 2, wherein N1 is equal to or more than 6, N2 is a multiple of 2, wherein N2 is equal to or more than 4, and N3 is an integer, wherein N3 is equal to or more than 1.

3. A rotary electric machine according to claim 1, wherein the magnetic pole pieces connected to the short circuit magnetic path in the same stack plane comprises at least one magnetic pole piece that has a different polarity, and wherein the following condition is satisfied: $N1 \geq N2+N3$, where N1 represents a number of all the magnetic poles, N2 represents a total number of permanent magnets adjacent to the magnetic pole pieces that are connected to the short circuit magnetic path in the same stack plane, and N3 represents a total number of permanent magnets held in contact with the protruding portion in the same stack plane, provided that N1 is a multiple of 2, wherein N1 is equal to or more than 4, N2 is an integer, wherein N2 is equal to or more than 3, and N3 is an integer, wherein N3 is equal to or more than 1.

4. A rotary electric machine according to claim 1, wherein the rotor core comprises rotationally stacked layers in the same stack plane that include the short circuit magnetic path.

5. A rotary electric machine according to claim 1, wherein the permanent magnets comprise a half number of permanent magnets embedded in every other gap of the plurality of gaps.

6. A rotary electric machine according to claim 1, wherein the permanent magnet comprises a rare earth metal for enhancing a coercive force, the rare earth metal being added more to an inner circumferential part of the permanent magnet than to an outer circumferential part of the permanent magnet.

7. A rotary electric machine according to claim 1, wherein a part of the permanent magnet positioned on an inner circumferential side of the rotor has a circumferential width larger than a width of a part of the permanent magnet positioned on an outer circumferential side of the rotor.

* * * * *